M. N. KRIEGER.
POULTRY DIP HOLDER.
APPLICATION FILED APR. 15, 1919.
1,323,071.
Patented Nov. 25, 1919.
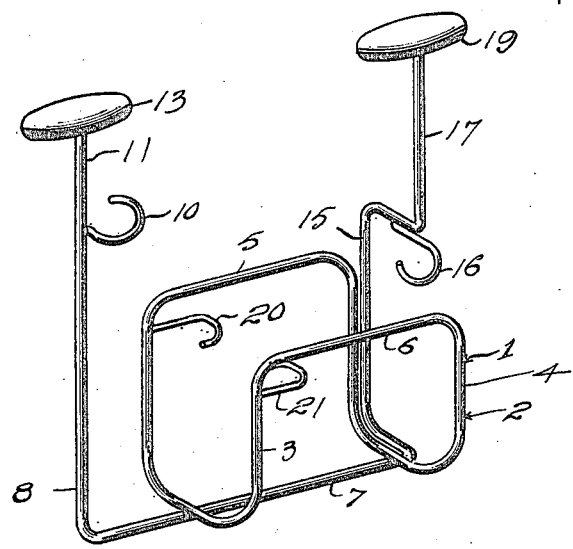
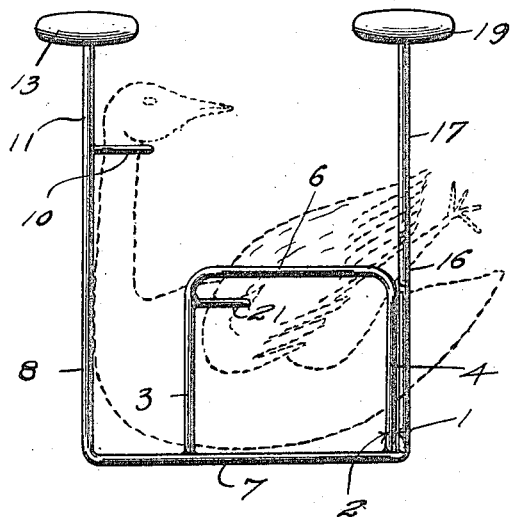
Inventor
M. N. Krieger

UNITED STATES PATENT OFFICE.

MATHILDE N. KRIEGER, OF DANFORTH, ILLINOIS.

POULTRY-DIP HOLDER.

1,323,071.     Specification of Letters Patent.     Patented Nov. 25, 1919.

Application filed April 15, 1919. Serial No. 290,159.

*To all whom it may concern:*

Be it known that I, MATHILDE N. KRIEGER, a citizen of the United States, residing at Danforth, in the county of Iroquois and State of Illinois, have invented certain new and useful Improvements in Poultry-Dip Holders; and I do hereby declare the following to be a full, clear, and exact description of the invention, such as will enable others skilled in the art to which it appertains to make and use the same.

This invention relates to poultry holders and the primary object of the invention is to provide an improved means for holding a fowl while the same is being scalded preparatory to dressing the same, so that the hands of the user will not come in contact with the scalding water.

A still further object of the invention is to provide a frame for receiving a fowl, which is so formed, that the neck and legs are held above the body thereof, so that when the frame is immersed in the scalding water, the neck and head and legs, will be held above the frame so that the buyers of the poultry thus dressed may readily see by the condition of the head and legs, whether the fowl is fresh and undiseased.

A further object of the invention is to provide a frame for receiving the carcass of a fowl having upwardly extending hooks for receiving the head and legs thereof, and thereby holding the head and legs above the carcass during the scalding operation.

A still further object of the invention is to provide an improved device of the above character, which is durable and efficient in use, one that is simple and easy to manufacture, and one that can be manufactured and placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a perspective view of the improved poultry dip holder, and

Fig. 2 is a side elevation of the same, showing the fowl placed therein ready for the dipping operation.

Referring to the drawings in detail, wherein similar reference characters designate corresponding parts throughout the several views, the numeral 1 generally indicates the improved dip holder, including the frame 2 formed of substantially U-shaped front and rear supporting members 3 and 4, which are arranged in alinement with each other and have the upper terminals of their legs connected by longitudinally extending bars 5 and 6, which form side bars for engaging the body of the fowl, when the same is placed in the frame. A central longitudinally extending bar 7 is secured to the bight portions of the U-shaped members 2 and 3 and extends forwardly from the same and then bent upwardly at right angles as at 8. The upper portion of the right angular member 8 carries a hook 10 which extends in a horizontal plane and is adapted to receive the neck of the fowl directly below the head thereof, so as to hold the head in an elevated position.

The right angular member 8 is continued above the hook 10 as at 11 and the same has secured thereto the wooden grip 13, which constitutes a handle whereby the same may be readily handled.

The central bar 7 adjacent to the rear U-shaped member 4 is provided with the upwardly extending arm 15, which is provided with the open hook 16 which is adapted to receive the feet of the fowl and holds the same in an elevated position.

The hook 16 is provided with the upwardly extending rod 17, which has secured thereto the wooden grip 19 to form a handle, at the rear portion of the frame.

In operation of the improved device, the fowl is laid in the frame 2 with its back downward, and the neck is inserted in the hook 10 which holds the head in its raised position and the feet are then placed in the hook 16 and the wings are caught directly below the first joint in hooks 20 and 21 formed on the legs of the forward U-shaped member 22 which hold the wings spaced from the body and in a raised position. The device is then grasped by the handles 13 and 19 and immersed in the scalding water, so that the entire body of the fowl is scalded with the exception of the head and legs which are elevated above the water. This allows the fowl to be readily dressed with the exception of the head and feet, which are left in their original condition, which permits buyers of the poultry to readily examine the fowl and tell whether the same is fresh and undiseased.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A device of the class described comprising a frame arranged to receive the body of a fowl, and means formed on the frame for receiving the neck and legs of the fowl for holding the same in an elevated position, as and for the purpose specified.

2. A poultry holder comprising an open frame arranged to receive the body of a fowl, means formed on the frame for holding and engaging the legs and neck of the fowl to hold the same above the body thereof, and handles carried by the frame and arranged above the body of the fowl, as and for the purpose specified.

3. A poultry dip holder comprising an open frame arranged to receive the body of the fowl, means formed on the front of the frame for receiving and holding the neck and head of a fowl, and means formed on the rear end of the frame for receiving and holding the legs of the fowl, as and for the purpose specified.

4. A poultry dip holder comprising an open frame arranged to receive the body of a fowl, means formed on the front of the frame for receiving and holding the neck and head of the fowl above the body thereof, means formed on the rear end of the frame for engaging and holding the feet of the fowl above the body thereof, and means formed on the side edge of the frame for engaging and holding the wings of the fowl, as and for the purpose specified.

5. A poultry dip holder comprising an open frame arranged to receive the body of a fowl, upwardly extending arms formed on the front and rear ends of the frame, hooks formed on the upper ends of the arms, said hooks being arranged to receive and hold the neck and legs of the fowl respectively, and hooks formed on the side edges of the frame arranged to engage and hold the wings of the fowl, as and for the purpose specified.

6. A poultry dip holder comprising an open frame arranged to receive the body of the fowl, upwardly extending arms formed on the front and rear ends of the frame, hooks formed on the upper ends of the arms and arranged to receive the head and feet of the fowl, hooks formed on the side edge of the frame arranged to receive and hold the wings of the fowl, and handles carried by the hooks formed on the front and rear ends of the frame, as and for the purpose specified.

7. In a scalding device for poultry, an open metallic frame arranged to receive the body of a fowl, and means carried by the frame for engaging the wings of the fowl to hold the same in elevated position.

8. In a device for scalding poultry, an open frame formed of wire arranged to receive the body of the fowl, handles carried by the frame and arranged above the same, and hooks carried by said frame adjacent to the upper end thereof for engaging the legs and wings of a fowl, as and for the purpose specified.

In testimony whereof I affix my signature in presence of two witnesses.

Mrs. MATHILDE N. KRIEGER.

Witnesses:
 WALTER H. KIMMEL,
 RAY C. KRIEGER.